(12) United States Patent
Gallagher et al.

(10) Patent No.: US 9,185,469 B2
(45) Date of Patent: Nov. 10, 2015

(54) SUMMARIZING IMAGE COLLECTION USING A SOCIAL NETWORK

(75) Inventors: Andrew Charles Gallagher, Fairport, NY (US); Aaron Thomas Deever, Pittsford, NY (US)

(73) Assignee: KODAK ALARIS INC., Rochester, NY (US)

( * ) Notice: Subject to any disclaimer, the term of this patent is extended or adjusted under 35 U.S.C. 154(b) by 417 days.

(21) Appl. No.: 12/894,200

(22) Filed: Sep. 30, 2010

(65) Prior Publication Data

US 2012/0084655 A1  Apr. 5, 2012

(51) Int. Cl.
| | | |
|---|---|---|
| G06F 3/00 | (2006.01) |
| H04N 21/8549 | (2011.01) |
| G11B 27/034 | (2006.01) |
| G11B 27/28 | (2006.01) |
| H04L 29/06 | (2006.01) |
| H04N 21/45 | (2011.01) |
| H04N 21/466 | (2011.01) |
| H04N 21/4788 | (2011.01) |

(52) U.S. Cl.
CPC .......... *H04N 21/8549* (2013.01); *G11B 27/034* (2013.01); *G11B 27/28* (2013.01); *H04L 65/604* (2013.01); *H04N 21/4532* (2013.01); *H04N 21/466* (2013.01); *H04N 21/4788* (2013.01)

(58) Field of Classification Search
CPC .... G11B 27/28; G11B 27/034; H04L 65/604; H04N 21/4532; H04N 21/466; H04N 21/4788; H04N 21/8549
USPC .......... 715/725, 733, 738, 739, 741, 742, 743
See application file for complete search history.

(56) References Cited

U.S. PATENT DOCUMENTS

| | | |
|---|---|---|
| 5,956,026 A | 9/1999 | Ratakonda |
| 6,847,733 B2 * | 1/2005 | Savakis et al. ................ 382/225 |
| 6,940,545 B1 | 9/2005 | Ray |
| 7,266,383 B2 * | 9/2007 | Anderson ..................... 455/518 |
| 7,483,618 B1 | 1/2009 | Edwards et al. |
| 7,630,562 B2 | 12/2009 | Gong et al. |

(Continued)

FOREIGN PATENT DOCUMENTS

WO   2010/101851    9/2010

OTHER PUBLICATIONS

Proud Geek, "Facebook Privacy: Are Your Photos Private?" http://blog.proud-geek.com/2008/05/19/facebook-privacy-are-your-photos-private/, May 19, 2008.*

(Continued)

*Primary Examiner* — Omar Abdul-Ali
*Assistant Examiner* — Jennifer Nicholas
(74) *Attorney, Agent, or Firm* — Hogan Lovells US LLP

(57) ABSTRACT

A method for reducing the number of images or the length of a video from a digital image collection using a social network, includes receiving a digital image collection captured by a user to be viewed by a viewer; wherein the viewer and the user are members of the same social network and using a processor to access the social network to determine a relationship between a viewer and the user. The method further includes using the processor to determine a set of summarization parameters based on the relationship between the viewer and the user and using the processor to reduce the number of images or the length of the video from the digital image collection using the determined set of summarization parameters to be viewed by the viewer.

14 Claims, 4 Drawing Sheets

(56) References Cited

U.S. PATENT DOCUMENTS

| | | | |
|---|---|---|---|
| 7,639,275 B2 | 12/2009 | Li et al. | |
| 7,730,216 B1 | 6/2010 | Issa et al. | |
| 7,737,995 B2* | 6/2010 | Vronay et al. | 345/619 |
| 7,774,431 B2* | 8/2010 | Conn et al. | 709/219 |
| 7,788,260 B2 | 8/2010 | Lunt et al. | |
| 7,797,345 B1* | 9/2010 | Martino et al. | 707/792 |
| 7,822,631 B1* | 10/2010 | Vander Mey et al. | 705/7.29 |
| 7,844,671 B1* | 11/2010 | Lawler et al. | 709/206 |
| 7,870,481 B1* | 1/2011 | Zaud et al. | 715/234 |
| 7,890,871 B2* | 2/2011 | Etkin | 715/738 |
| 8,073,786 B2* | 12/2011 | Solari | 705/319 |
| 8,078,623 B2* | 12/2011 | Chou et al. | 707/737 |
| 8,091,032 B2* | 1/2012 | Fischer | 715/751 |
| 8,135,800 B1* | 3/2012 | Walsh et al. | 709/217 |
| 8,185,558 B1* | 5/2012 | Narayanan et al. | 707/798 |
| 8,285,810 B2* | 10/2012 | Svendsen et al. | 709/217 |
| 8,345,934 B2* | 1/2013 | Obrador et al. | 382/115 |
| 8,463,846 B2* | 6/2013 | Girbal | 709/203 |
| 2002/0070982 A1* | 6/2002 | Hill et al. | 345/835 |
| 2002/0093591 A1* | 7/2002 | Gong et al. | 348/515 |
| 2003/0236832 A1* | 12/2003 | McIntyre et al. | 709/204 |
| 2004/0170321 A1* | 9/2004 | Gong et al. | 382/173 |
| 2005/0171955 A1* | 8/2005 | Hull et al. | 707/10 |
| 2005/0177385 A1* | 8/2005 | Hull et al. | 705/1 |
| 2006/0184578 A1* | 8/2006 | La Rotonda et al. | 707/104.1 |
| 2006/0218225 A1* | 9/2006 | Hee Voon et al. | 709/201 |
| 2006/0248573 A1* | 11/2006 | Pannu et al. | 726/1 |
| 2007/0214180 A1* | 9/2007 | Crawford | 707/104.1 |
| 2007/0271297 A1* | 11/2007 | Jaffe et al. | 707/104.1 |
| 2008/0052349 A1* | 2/2008 | Lin | 709/203 |
| 2008/0133638 A1* | 6/2008 | Fischer et al. | 709/201 |
| 2008/0288499 A1* | 11/2008 | Choi et al. | 707/9 |
| 2009/0213245 A1 | 8/2009 | Harper et al. | |
| 2009/0216859 A1* | 8/2009 | Dolling | 709/218 |
| 2010/0031157 A1* | 2/2010 | Neer et al. | 715/738 |
| 2010/0119155 A1 | 5/2010 | Kurahashi | |
| 2010/0127921 A1* | 5/2010 | Chen et al. | 342/357.07 |
| 2010/0179874 A1* | 7/2010 | Higgins et al. | 705/14.53 |
| 2010/0318571 A1* | 12/2010 | Pearlman et al. | 707/784 |
| 2011/0022602 A1* | 1/2011 | Luo et al. | 707/748 |
| 2011/0087842 A1* | 4/2011 | Lu et al. | 711/126 |
| 2011/0107369 A1* | 5/2011 | O'Brien et al. | 725/38 |
| 2011/0113336 A1* | 5/2011 | Gunatilake | 715/723 |
| 2011/0173316 A1* | 7/2011 | Moromisato et al. | 709/224 |
| 2011/0191826 A1* | 8/2011 | Ballal et al. | 726/4 |
| 2012/0014560 A1* | 1/2012 | Obrador et al. | 382/103 |
| 2012/0072384 A1* | 3/2012 | Schreiner et al. | 706/45 |
| 2012/0072848 A1* | 3/2012 | Yonemoto | 715/744 |
| 2012/0137237 A1* | 5/2012 | Brenner et al. | 715/763 |
| 2013/0198811 A1* | 8/2013 | Yu et al. | 726/4 |

OTHER PUBLICATIONS

One Web Day, "Ways to Adjust Privacy Settings in Facebook," Sep. 2009, University of Wisconsin Milwaukee School of Information Studies, pp. 1 and 2.*

Turk et al, Eigenfaces for Recognition, Journal of Cognitive Neuroscience, 1991.

Wang, Visual Quality Assessment Based on Structural Distortion Measurement, Signal Processing: Image Communication 2004.

Li et al, Modeling and Recognition of Landmark Image Collections Using Iconic Scene Graphs, Proc. of the European Conference on Computer Vision 2008.

* cited by examiner

SUMMARIZING IMAGE COLLECTION USING A SOCIAL NETWORK

FIELD OF THE INVENTION

The present invention relates to using social relationships from a social network to summarize image collections that can contain still images or videos.

BACKGROUND OF THE INVENTION

In multimedia social networks, there are a flood of images and videos from many different members. People generally only look at a small fraction of the images or videos that their contacts in the social network publish. In an effort to address the problem, some people condense (summarize) their videos when sharing videos, and share only a small portion of the images.

There are methods for automatically summarizing a collection of images or videos. For example, in U.S. Pat. No. 7,630,562, there is a method for automatically summarizing a video (i.e. editing the video to produce a shorter version of the video) using a singular value decomposition. U.S. Pat. No. 7,639,275 describes a method of summarizing video content including football by retaining the highlights of the video and omitting non-highlights. In this manner, a viewer can watch the game in a shorter amount of time than would be necessary to watch the entire game.

U.S. Pat. No. 5,956,026 provides a method identifying a hierarchical collection of key frames in a digital video. A video summary includes of the collection of key frames and the video can be browsed by viewing just the key frames.

U.S. Pat. No. 7,483,618 provides a method for generating a video summary in which content of low quality or very little or no interest is identified and removed.

SUMMARY OF THE INVENTION

In accordance with the present invention there is a provided a method for reducing the number of images or the length of a video from a digital image collection using a social network, comprising:

(a) receiving a digital image collection captured by a user to be viewed by a viewer, wherein the viewer and the user are members of the same social network;

(b) using a processor to access the social network to determine a relationship between a viewer and the user;

(c) using the processor to determine a set of summarization parameters based on the relationship between the viewer and the user; and (d) using the processor to reduce the number of images or the length of the video from the digital image collection using the determined set of summarization parameters to be viewed by the viewer.

It is an advantage of the present invention that an effective method is provided for summarizing images and videos to share between people in a social network. The summarization of the images and videos is based on the relationship between the people, and has the effect of permitting a person to share more content with others in the social network who are more interested and less content with people who are less interested.

DETAILED DESCRIPTION OF THE INVENTION

The present invention describes a method for summarizing a collection of digital images or summarizing videos for presentation within an online social network. As used herein, a collection of digital images is a set of digital images, a set of 2D or 3D images, or 2D or 3D videos, i.e. a time series of 2D or 3D images or a series of images in a video along with the accompanying audio.

Figure 1:
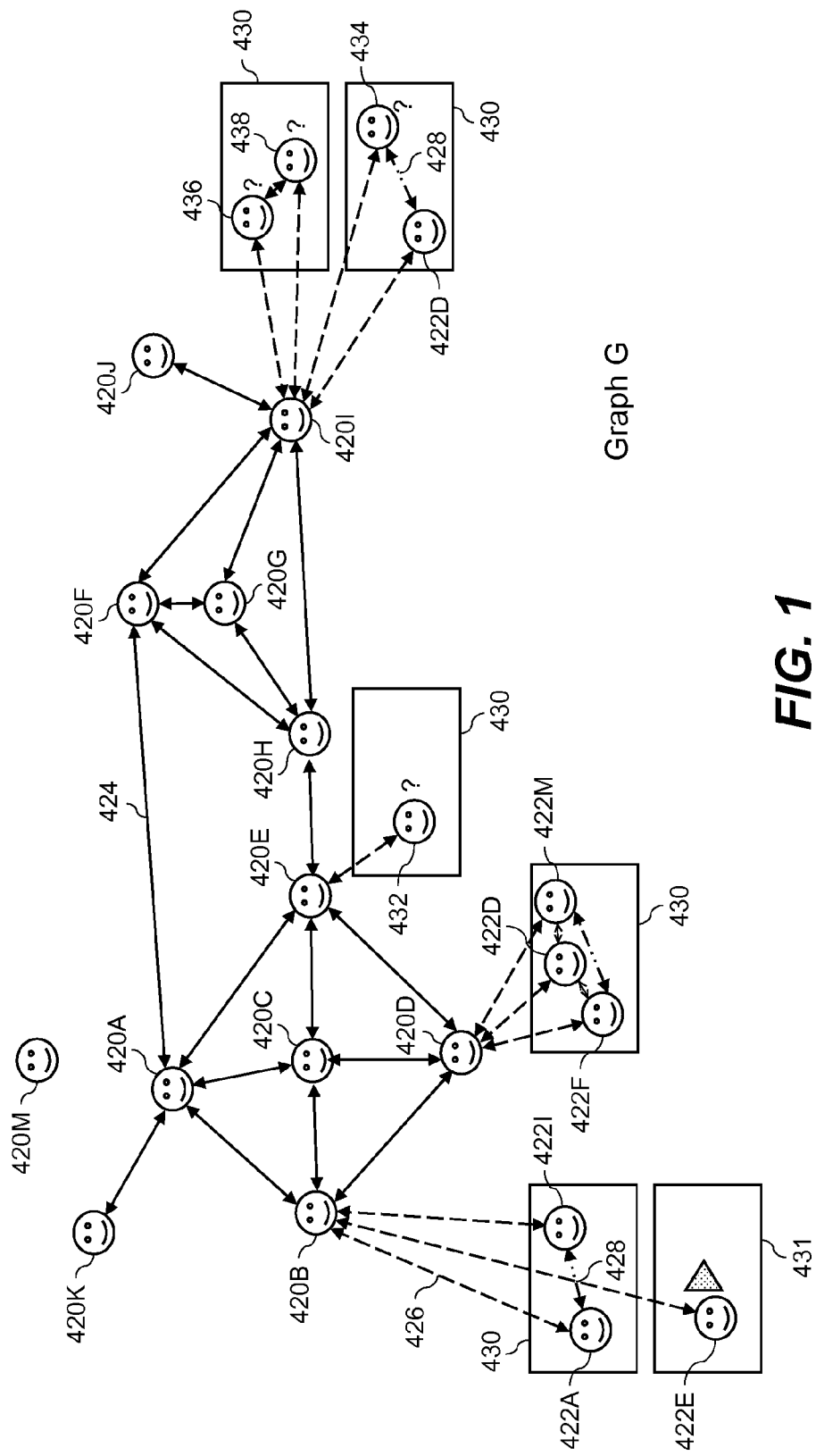
FIG. 1 is pictorial of an online social network.

In an online social network, people are connected by links or connections if they are socially connected with one another. The connection between a pair of people can indicate friendship, a coworker relationship, an acquaintance relationship, a set of common interests, a common membership (e.g. both people are members of a club), or an actual familial relationship such as spouses, or a mother-daughter relationship. In some embodiments, a social network is represented as a graph, where vertices (nodes) of the graph represent people, and edges represents a connection between the pair of people. FIG. 1 shows a representation of an online social network.

The social network is represented as a collection of data that exists on computer-readable memory. The social network includes a set of connections 424 or links between users (individuals), and the associated images, video, text and other multimedia files associated with each user.

FIG. 1 is used to illustrate an online social network. The figure includes 11 different individuals 420 (A-K) having user accounts. There are also digital media assets 430 such as digital images, videos, and audio clips. The digital media assets 430 are associated with individual user accounts. The digital media assets 430 contain persons 422 that are identified with labels. For example, user B has two associated digital media assets 430 (a digital image) and 431 (a video). The first contains two persons 422 (A and I), and the second (the video) contains one person 422 (E). There are also digital media assets 430 that contain individuals that are have not been identified such as unidentified individuals 432, 434, 436, and 438.

Notice that there are three types of connections shown in FIG. 1. First, there are friend connections 424 that directly connect user accounts. In some embodiments, these connections belong to one or more of several sub-categories, such as (familial relative, coworker, classmate, friend). Each of these sub-categories can have further sub-categories (e.g. familial relative has sub-categories of father-child, husband-wife, and siblings). A second type of connection is an associative connection 426 which is a link indicating that a person (e.g. person 420B) has a connection with an indicated person in a digital media asset 430 (such as people A, I and E (indicated as 422A, 422I, and 422E respectively) in the case of the person B (indicated as 420B)). The fact that the person has associated media assets containing specific individuals shows an implicit social connection between them. A third type of connection is an image connection 428 which is a link indicating that two people appear together in a digital media asset 430, such as the people A and I in a digital media asset 430 that belongs to individual B. Note that people that appear in digital media assets 430 do not necessarily have an individual user account (e.g. person M, indicated as 420M).

The illustration in FIG. 1 can be used to define a connection graph G over the individuals in the user accounts and identified in the digital media assets.

Figure 2:
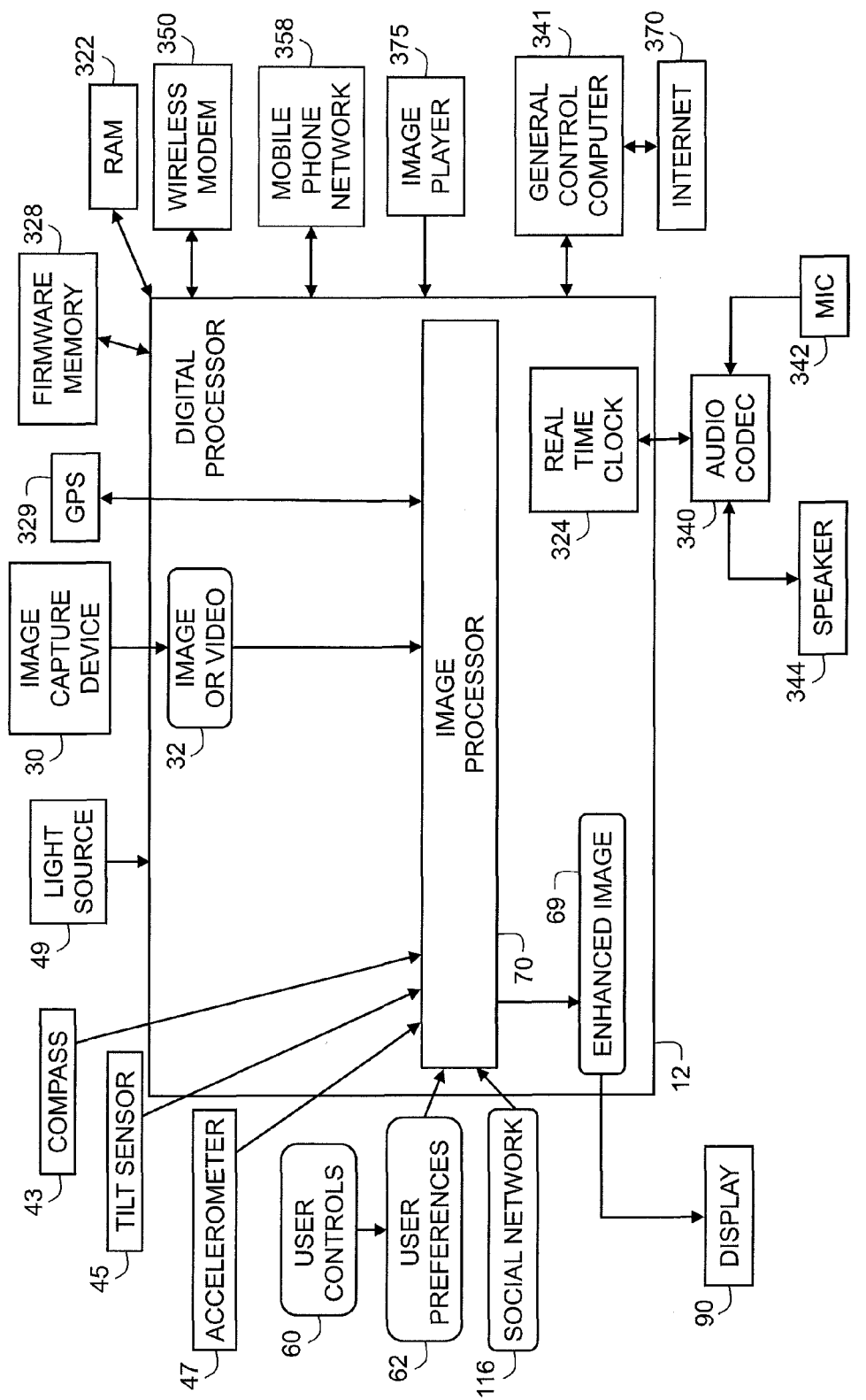
FIG. 2 is a block diagram of an image capture device and processing system that can be used to implement the present invention.

FIG. 2 is a block diagram of an image capture device and processing system that can be used to implement the present invention. A social network 116 can reside in computer readable memory of a single computer (e.g. a computer server, a personal computer, a laptop, a tablet, a camera, a smart phone, or other device containing integrated circuits), or the social network can reside across two or more computers. The present invention can also be implemented for use with any type of digital imaging device, such as a digital still camera, camera phone, personal computer, or digital video cameras, or with any system that receives digital images. As such, the invention includes methods and apparatus for both still images and videos. The present invention describes a system that uses an image capture device 30 for capturing an image or video 32. For convenience of reference, it should be understood that the image or video 32 refers to both still images and videos or collections of images. Further, the image or video 32 can be an image that is captured with a camera or image capture device 30. Further, the image or video 32 can be a single-view image (i.e. a 2D image) including a single perspective image of a scene at a time, or the image can be a set of images (a 3D image or a multi-view image) including two or more perspective images of a scene that are captured and rendered as a set. When the number of perspective images of a scene is two, the images are a stereo pair. Further, the image or video 32 can be a 2D or 3D video, i.e. a time series of 2D or 3D images. The image or video 32 can also have an associated audio signal. The system of FIG. 2 contains a display 90 for viewing images. The display 90 includes monitors such as LCD, CRT, OLED or plasma monitors, and monitors that project images onto a screen. The sensor array of the image capture device 30 can have, for example, 1280 columns×960 rows of pixels. When advisable, the image capture device 30 activates a light source 49, such as a flash, for improved photographic quality in low light conditions.

In some embodiments, the image capture device 30 can also capture and store video clips. The digital data is stored in a RAM buffer memory 322 and subsequently processed by a digital processor 12 controlled by the firmware stored in firmware memory 328, which can be flash EPROM memory. The digital processor 12 includes a real-time clock 324, which keeps the date and time even when the system and digital processor 12 are in their low power state.

The digital processor 12 operates on or provides various image sizes selected by the user or by the system. Images are typically stored as rendered sRGB image data is then JPEG compressed and stored as a JPEG image file in the memory. The JPEG image file will typically use the well-known EXIF (EXchangable Image File Format) image format. This format includes an EXIF application segment that stores particular image metadata using various TIFF tags. Separate TIFF tags can be used, for example, to store the date and time the picture was captured, the lens F/# and other camera settings for the image capture device 30, and to store image captions. In particular, the ImageDescription tag can be used to store labels. The real-time clock 324 provides a capture date/time value, which is stored as date/time metadata in each EXIF image file. Videos are typically compressed with H.264 and encoded as MPEG4.

In some embodiments, the geographic location stored with an image captured by the image capture device 30 by using, for example a GPS unit 329. Other methods for determining location can use any of a number of methods for determining the location of the image. For example, the geographic location can be determined from the location of nearby cell phone towers or by receiving communications from the well-known Global Positioning Satellites (GPS). The location is preferably stored in units of latitude and longitude. Geographic location from the GPS unit 329 is used in some embodiments to regional preferences or behaviors of the display system.

The graphical user interface displayed on the display 90 is controlled by user controls 60. The user controls 60 can include dedicated push buttons (e.g. a telephone keypad) to dial a phone number, a control to set the mode, a joystick controller that includes 4-way control (up, down, left, right) and a push-button center "OK" switch, or the like. The user controls 60 are used by a user to indicate user preferences 62 or to select the mode of operation or settings for the digital processor 12 and image capture device 30.

The display system can in some embodiments access a wireless modem 350 and the internet 370 to access images for display. The display system is controlled with a general control computer 341. In some embodiments, the system accesses a mobile phone network 358 for permitting human communication via the system, or for permitting signals to travel to or from the display system. An audio codec 340 connected to the digital processor 12 receives an audio signal from a microphone 342 and provides an audio signal to a speaker 344. These components can be used both for telephone conversations and to record and playback an audio track, along with a video sequence or still image. The speaker 344 can also be used to inform the user of an incoming phone call. This can be done using a standard ring tone stored in firmware 328, or by using a custom ring-tone downloaded from a mobile phone network 358 and stored in the memory 322. In addition, a vibration device (not shown) can be used to provide a quiet (e.g. non audible) notification of an incoming phone call.

The interface between the display system and the general purpose computer 341 can be a wireless interface, such as the well-known Bluetooth® wireless interface or the well-known 802.11b wireless interface. The image or video 32 can be received by the display system via an image player 375 such as a DVD player, a network, with a wired or wireless connection, via the mobile phone network 358, or via the internet 370. It should also be noted that the present invention can be implemented in a combination of software and hardware and is not limited to devices that are physically connected or located within the same physical location. The digital processor 12 is coupled to a wireless modem 350, which enables the display system to transmit and receive information via an RF channel 250. The wireless modem 350 communicates over a radio frequency (e.g. wireless) link with the mobile phone network 358, such as a 3GSM network. The mobile phone network 358 can communicate with a photo service provider, which can store images. These images can be accessed via the Internet 370 by other devices, including the general purpose computer 341. The mobile phone network 358 also connects to a standard telephone network (not shown) in order to provide normal telephone service.

Referring again to FIG. 2 the digital processor 12 accesses a set of sensors including a compass 43 (preferably a digital compass), a tilt sensor 45, the GPS unit 329, and an accelerometer 47. Preferably, the accelerometer 47 detects both linear and rotational accelerations for each of three orthogonal directions (for a total of 6 dimensions of input). This information can be used to improve the quality of the images using an image processor 70 (by, for example, deconvolution) to produce an enhanced image 69, or the information from the sensors can be stored as metadata in association with the image and later used by the collection analyzer 106 of FIG. 3 to determine the quality of each image or video in the collection. In the preferred embodiment, all of these sensing devices are present, but in some embodiments, one or more of the sensors is absent.

Further, the image processor 70 is applied to the images or videos 32 based on user preferences 62 to produce the enhanced image 69 that is shown on the display 90. The image processor 70 improves the quality of the original image or video 32 by, for example, removing the hand tremor from a video.

Although FIG. 1 shows an illustrative social network with 12 individuals as members, real-life social networks can contain millions of members. Individual members can have hundreds or thousands of connections in the graph G. If even a small percentage of connections of a member of the social network post a collection of images or videos, the member can be deluged with a large number of images and videos from friends in the social network. For example, if social network member Jerry has 500 friends, and of these, 50 post a collection of, on average 50 images and videos, Jerry will have access to 2500 images and videos. The images and videos that Jerry really would like to see become difficult to find when mixed among all the rest of the images and videos from others in the social network.

Figure 3:
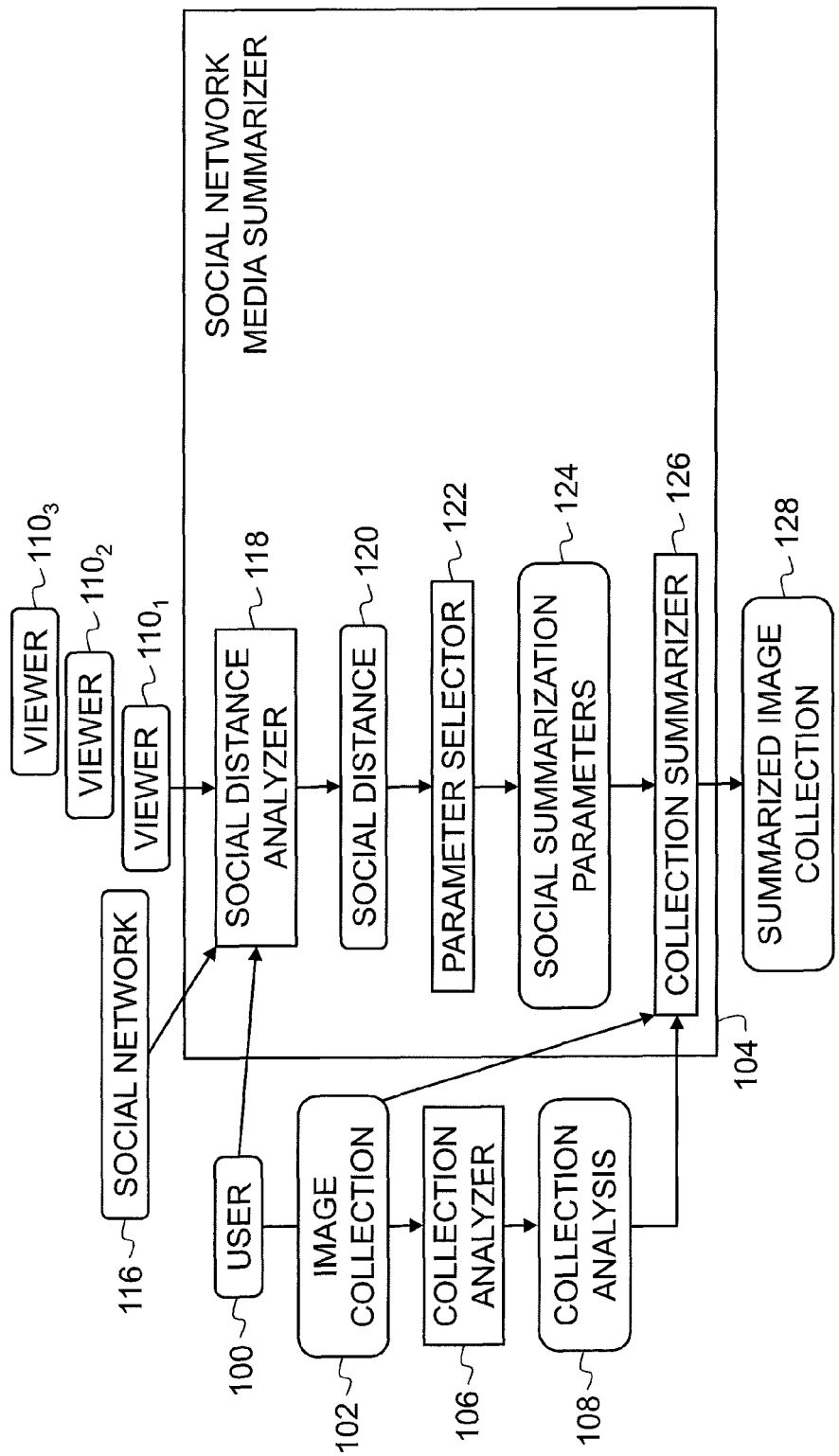
FIG. 3 is a block diagram illustrating the social network media summarizer 104.

FIG. 3 is a block diagram illustrating a social network media summarizer 104 that considers the relationship between pairs of people when determining how to summarize the images and videos that are posted to the social network 116 be a user for viewing by a viewer. In this context, a "user" is a member of the social network 116 who is posting digital media assets 430 such as images and videos, and a viewer is a member of the social network 116 who is receiving the posted digital media assets 430 for viewing.

A user 100 has an image collection 102 of digital media assets 430 that contain images and videos 32. The image collection 102 is processed by the collection analyzer 106 that produces a collection analysis 108 that indicates the quality of each image in the image collection 102 and proposes for each video a set of possible summarized (edited and condensed) versions of the video. The collection analyzer 106 preferably implements a method for determining the aesthetic quality of images, as described in commonly-assigned U.S. patent application Ser. No. 12/566,706 filed Sep. 25, 2010, entitled "Estimating Aesthetic Quality of Digital Images" by Cerosaletti et al. The collection analyzer 106 determines proposed summarizations for videos in the image collection 102. For producing proposals for video summarizations, the collection analyzer 106 preferably uses the method described in commonly-assigned U.S. patent application Ser. No. 12/786,480 filed May 25, 2010, entitled "Determining Key Video Snippets Using Selection Criteria", by A. Deever. This method determines a set of key frames that represent the video. Individual key frames are selected based on several features, including camera motion. Video frames having small amounts of camera motion are favored as candidates for key frames, so that the key frame is not blurred by camera motion. The set of key frames are ranked, according to features such as camera fixation. Camera fixation indicates the percentage of the entire video capture for which the camera was fixated on a given region of the scene. Video key frames corresponding to regions of high camera fixation are ranked highly, as they belong to parts of the video of potentially high interest. The video summary can be formed by merging snippets of video, wherein each snippet corresponds to a collection of video frames surrounding a highly ranked key frame. Video summarization parameters include the desired length of the summary, minimum length of any snippet of video contained in the summary, and the total number of snippets contained in the summary. The collection analyzer 106 can produce proposals for video summarizations having a variety of total lengths, number of snippets, and minimum snippet lengths.

The collection analysis 108 contains a set of possible playback instructions that indicate portions of the video to play as a summary. For example, if the video is 1 minute long, than an 18 second version of the video is to play from 0:02 to 0:10 and from 0:20 to 0:30. A 12 second version of the video is to play from 0:14 to 0:26. It is assumed that videos contain both audio and image information, and the playback instructions describe playback for both audio and video, alternatively there are a separate set of instructions for playback of audio and video information.

The collection analyzer 106 can also produce the collection analysis 108 that indicates information relevant to each image and video. Examples of such information include identities of individuals present in the images and videos, activities occurring in the captured scene, location of the captured scene, and other significant non-person objects identified in the scene. Identities of individuals present in image and videos can be determined by face detection and recognition algorithms, such as described in U.S. Pat. No. 6,940,545 and in "Eigenfaces for Recognition" by Turk et al, Journal of Cognitive Neuroscience, 1991. Activity detection in images and videos can be used to identify particular activities of interest, such as weddings, parties, sporting events and performances. The location of the captured scene can be estimated using GPS data 329 collected at capture time. Other significant objects in the scene, such as pets, can be detected as in U.S. Patent Application Publication 2010/0119155.

Information relevant to individual videos can be used as an additional input to the collection analyzer 106 for generating proposals for video summarization. In particular, summaries can be biased to focus on specific individuals or activities. Viewers $110_1$ with strong social connections to the individuals or activities in the video can receive a version of the summary that focuses on the specific individuals or activities.

The collection analyzer 106 can also determine an overall quality of an individual video using methods known in the art. One example of such a method is described by Z. Wang in "Visual Quality Assessment Based on Structural Distortion Measurement", Signal Processing: Image Communication, 2004.

A viewer $110_1$ is also a member of the same social network as the user 100. The social relationship between the viewer $110_1$ and the user 100 is used by the present invention to summarize the user's image collection 102 for presentation to the viewer $110_1$. To this end, a social distance analyzer 118 accesses the social network 116 to determine a social distance 120 between the user 100 and the viewer $110_1$. Determining the distance between two people in the social network 116 can be performed by any of a number of methods.

In one simple version, the distance between the user 100 and the viewer $110_1$ is simply the shortest path in the graph G that represents the social network. For example, a friend of the user 100 has a distance of 1, a friend of a friend has distance 2, and so on. In some cases, the social distance 120 is not simply a scalar, but also contains categorical information such as the types of relationships (e.g. familial relationship, friend, coworker, colleague, classmate) along the shortest path between the user 100 and the viewer $110_1$. In another embodiment, the social distance 120 between the user 100 and the viewer $110_1$ is the shortest path among graphs having only one type of social connection (where the types of connections include familial relationship, friend, coworker, colleague, classmate). For example, the social distance 120 can be "family 2" or "friend 1". In another embodiment, the social distance 120 is found with the method described in U.S. Pat. No. 7,788,260.

To illustrate a further alternative embodiment, the graph G is defined over all the connections in the network. For example, FIG. 1 contains 12 individuals (A, B, C, D, E, F, G, H, I, J, K and M). The graph G is represented as a 12×12 matrix where nonzero entries indicate graph edges. A graph is a set of vertices (in our case, the individuals) and a set of pairs of vertices (in our case, the connections between individuals or identified individuals in digital media assets 430). The values of the nonzero entries indicate the weights of the graph edges (i.e. the strength of connections). The values in the matrix can be calculated using:

$$G(x, y) = 1 \prod_{i \in B} d_i(x, y)$$

where $d_i(x,y)$ is a value related to the presence of a connection. The indicator i represents the type of friend connection (when i=1, the connection is a friend connection, when i=2, the connection is an associate connection, and when i=3 the connection is an image connection.) The set B is the set of indices such that $d_i(x,y)$ is nonzero. Thus, the weight $G(x,y)$ is the product of the weights of all the existing connections between person x and person y. For example, $d_1(x,y)$ can be set to 0.5 if individuals x and y have a direct friend connection 424 between user accounts, and can be set to 0 otherwise. Note that in some embodiments, the weight for a direct connection varies based on the connection type (e.g., relative, coworker, classmate, friend). Similarly, $d_2(x,y)$ can be set to 0.75 if individuals x and y have an associative connection 426 between a user account and a digital media asset 430 and 0 otherwise, and $d_3(x,y)$ can be set to 0.67 if individuals x and y have an image connection 428 within the digital media asset 430. Note that other connections can also contribute to weights in the graph between individuals. For example, membership in common or related groups, or similarity in interests between two people indicates some likelihood that these people will become or are acquainted.

The social distance between any two individuals 420 in the social network 116 is a function of the graph G. In the preferred embodiment, the social distance 120 $s_G(i,j)$ is a function f( ) of features extracted from the graph G so that $s_G(i,j)=f(G_F)$, where $G_F$ are featured extracted from the graph. In one embodiment, the feature vector is the length of the shortest path (the path with the smallest sum) between the people i and j. For example, in FIG. 1, the weights to other people based on the shortest path from the owner of the person E containing the unidentified individual 432 to each of the others is: $G_F=$ [0.5, 0.75, 0.5, 0.5, 0.0, 1.0, 1.0, 0.5, 1.0, 1.5, 1.0, 1.0] corresponding to the individuals 420 (A, B, C, D, E, F, G, H, I, J, K, M). This feature is based on the idea of finding the distance between individuals 420 in the graph that represents the social network. Note there are more than two weights possible for the candidate individuals. It can be seen that this approach has the desired affect that a smaller distance is given to persons who are directly connected to the owner of the digital media asset 430 than to persons who are indirectly connected to the owner of the digital media asset 430.

In other methods, the features are based on a set of paths between the user 100 and the viewer 110₁. For example, considering only the direct connections between user accounts, there are 3 paths of length 2 (in the non-weighted version of the graph G) between B and E (B-A-E, B-C-E, B-D-E) but only one path of length 2 between individuals E and G (G-H-E). Therefore, there is a stronger connection between B and E than between E and G, and consequently the social distance 120 between B and E is smaller than between E and G.

Further, the graph can be thought of as representing a flow network and the feature can be the amount of flow passing through a given node (i.e., individual in the network) when the flow source is the unidentified individual. Algorithms to analyze the flow in a network are well known in the art, such as min-cut maxflow algorithms. Still further, the graph can be though of as a resistor network in electrical circuit design, with each edge in the graph having a certain resistance. Then, the social distance 120 between any two people is the resulting equivalent resistance between their corresponding nodes in the graph. In some embodiments, other factors are considered when determining the social distance 120 between two people in the social network 116, including the frequency of interaction between the pair (e.g. the number of messages exchanged in the past year), or the number or percentage of images or videos shared from one to the other of the pair that the viewer actually clicked on, viewed, commented on, or watched.

The social distance 120 between the user 100 and the viewer 110₁ is passed to a parameter selector 122 for selecting social summarization parameters 124 that determine how to summarize the user's image collection 102 for presentation to the viewer 110₁. The social summarization parameters 124 can come in a number of forms. For example, the social summarization parameters 124 can indicate that the viewer 110₁ should be able to access the entire image collection 102. This might be appropriate if the user 100 and viewer 110₁ are especially close, for example, daughter and mother, respectively. Alternatively, the social summarization parameters 124 can indicate that only N of the images from the image collection 102 should be shared with the viewer 110₁, and the total length of all videos should be not greater than T seconds. For example, if the user 100 and viewer 110₁ are coworkers, then the social summarization parameters 124 indicate that no more than 3 images and the total length of all videos should not exceed 36 seconds. In another embodiment, the social summarization parameters 124 indicate the maximum percentage of the total images and videos from a particular user 100 to that viewer 110₁ over a given time period (e.g. 1 day). The parameterization is determined for a viewer 110₁ by considering all users 100 that have uploaded image collections 102. For example, suppose a viewer Tom 110₁ has three friends with uploaded image collections and has social distance 120 to the friends as follows: [0.5 1.0 2.0] (meaning that Tom is socially closest to the first friend, then less close to the second, and least close to the third). Tom has a limit of viewing 42 images per day, and the three friends have each uploaded image collections with 150 images. In this case, the social summarization parameters 124 indicate that Tom will be presented 24 images from the first friend, 12 from the second, and 6 from the third. Each user 100 is permitted to have:

$$N_i = T \frac{D_i^{-1}}{\sum_n D_n^{-1}}$$

Where T is the total number of images (or length of video) that the viewer 110₁ is interested in viewing over a certain time interval, $D_i$ is the social distance 120 between the viewer $110_1$ and a particular user 100, and $N_i$ is the maximum number of images (or length of video) that can be contributed by the $i^{th}$ user 100. When the user has fewer images or total video length smaller than the limit, then the excess is passed on to the other users in the social network. For example, if the first user has an image collection of only 20 images when the value of N for that user is 24, then the next user can exceed their value of N by 4.

The social summarization parameters 124 can also indicate that a certain viewer $110_1$ can only see images or videos of a certain content. For example, a user 100 can decide that images containing his family can only be viewed by social connections 424 classified as "relative" or "friend", while images of the research project he is working on can only be viewed by social connections 424 classified as "co-workers". In another example, a user 100 can belong to a specify organization such as a sailing club, and choose only to share images and videos containing sailing content with social connections 424 who belong to the same club. Similarly, the social summarization parameters 124 can indicate that a certain viewer $110_1$ prefers images and videos having certain content.

The social summarization parameters 124 can be determined automatically by the parameter selector 122. Alternatively, the user 100 can designate summarization parameters 124 for members of his or her social network. The viewer $110_1$ can also designate summarization parameters 124 with respect to a particular user 100. For example, a particular viewer $110_1$ can choose to view only one minute of video per day from a particular user 100, and set summarization parameters 124 accordingly.

The collection summarizer 126 summarizes the images and videos 32 on the image collection 102 in accordance with the social summarization parameters 124 and produces a summarized image collection 128. This process is repeated for each viewer $110_2$, $110_3$, in the social network 116 having a social distance 120 to the user 100 that meets a specific criteria (e.g. there exists a direct connection between the viewer and the user 100, or the viewer $110_1$ has a social distance 120 less than 2 from the user 100).

For summarizing a collection of images, a collection summarizer 126 performs any of a number of methods known in the art. For example, on one preferred method, the collection summarizer simply takes the top N images of the image collection 102 based on an ordering of the images in terms of image quality from the collection analysis 108. In other embodiments, the collection summarizer 126 selects the N images of the image collection that represent the collection, using for example measures of mutual information between the selected images and the other images in the image collection 102. Such a method is described in Modeling and Recognition of Landmark Image Collections Using Iconic Scene Graphs. X. Li, C. Wu, C. Zach, S. Lazebnik and J.-M. Frahm. *Proceedings of the European Conference on Computer Vision,* 2008.

In other embodiments, the collection summarizer 126 considers the identity of and attributes of the viewer $110_1$ in relation to the content of the image collection 102. For example, if the viewer $110_1$ is a relative of the user 100, images in the image collection 102 that are identified as containing family members can be ranked relatively higher than images not containing family members. In another example, the viewer's $110_1$ social connections can be considered, such that images in the image collection 102 that are identified as containing friends of the viewer $110_1$ can be ranked more highly than images not containing friends of the viewer $110_1$. In another example, the known interests of the viewer $110_1$ can be considered, such that images in the image collection 102 that pertain to the viewer's $110_1$ known interests (e.g. images of mountains, images of bicycling, images from Paris, images of baseball games) can be ranked more highly than images not pertaining to the viewer's $110_1$ known interests.

A viewer's $110_1$ interests can be learned or known in many different ways. Such methods include analysis of the viewer's $110_1$ own image collection, consideration of social clubs and groups of which the viewer $110_1$ is a member, and explicit tags listed by either the user or the viewer $110_1$ that indicate interests of the viewer $110_1$. For example, a user Caitlyn can have a friend Will who is known to be an avid outdoorsman. Caitlyn can explicitly set a tag that indicates Will's interest in the outdoors such that the collection summarizer 126 favors outdoor pictures when generating a summarized image collection 128 for Will.

For summarizing a collection of videos, the collection summarizer 126 performs any of a number of known methods in the art. Given a total video time allocation of T seconds, the collection summarizer 126 can include whole videos according to a quality ranking provided by the collection analyzer 108 until the time allotment is reached. Alternatively, the collection summarizer 126 can distribute the T seconds of allotted video among the entire collection of videos according to their relative quality. For example, if $Q_i$ is the quality of video i, it receives $T_i$ of video time allocation according to the following formula:

$$T_i = \frac{Q_i}{\sum_i Q_i} T.$$

In order to prevent the dilution of the allocated time among too many videos, the time allocation can be restricted to the top N ranking videos. In the above formula, if a given video is allotted more time than the length of the video, the excess time can be distributed among the remaining videos. The above formula does not explicitly account for the varying original lengths of different videos. The original length of videos can be included in the overall quality value assigned to each video, such that longer videos receive longer time allocation than shorter videos.

In another method of summarizing a collection of videos, the collection summarizer 126 weights the allotment of time among videos in the collection according to the content of the videos relative to the interests of the viewer $110_1$. For a viewer $110_1$ having known social connections to particular individuals, extra weight and hence greater allocation of time can be assigned to videos containing those individuals. Similarly, videos containing content of interest—particular places, or activities—can receiver greater allocation of time.

When the user 100 has a collection of multiple videos that are summarized for the viewer $110_1$, the summarized video can take the form of a collection of independent, smaller video summaries. Alternatively, the individual video summaries can be merged into a single representative video. This permits easy viewing of the video summaries, as only one video file needs to be accessed. Appropriate transitions, such as fades from one video to another, can be used to gracefully transition from one video summary to the next.

After viewing the summarized image collection 128, the viewer $110_1$ can decide to request additional content from the user 100. The request can be for the viewer $110_1$ to receive all of the remaining content from the user 100. Alternatively, the viewer $110_1$ can request limited additional content, in which case the collection summarizer 126 can determine the additional content to be shared. The viewer $110_1$ can also request specific additional content from the user 100, such as any additional images containing a particular individual. The user 100 can choose to accept or deny any request for additional content.

Figure 4:
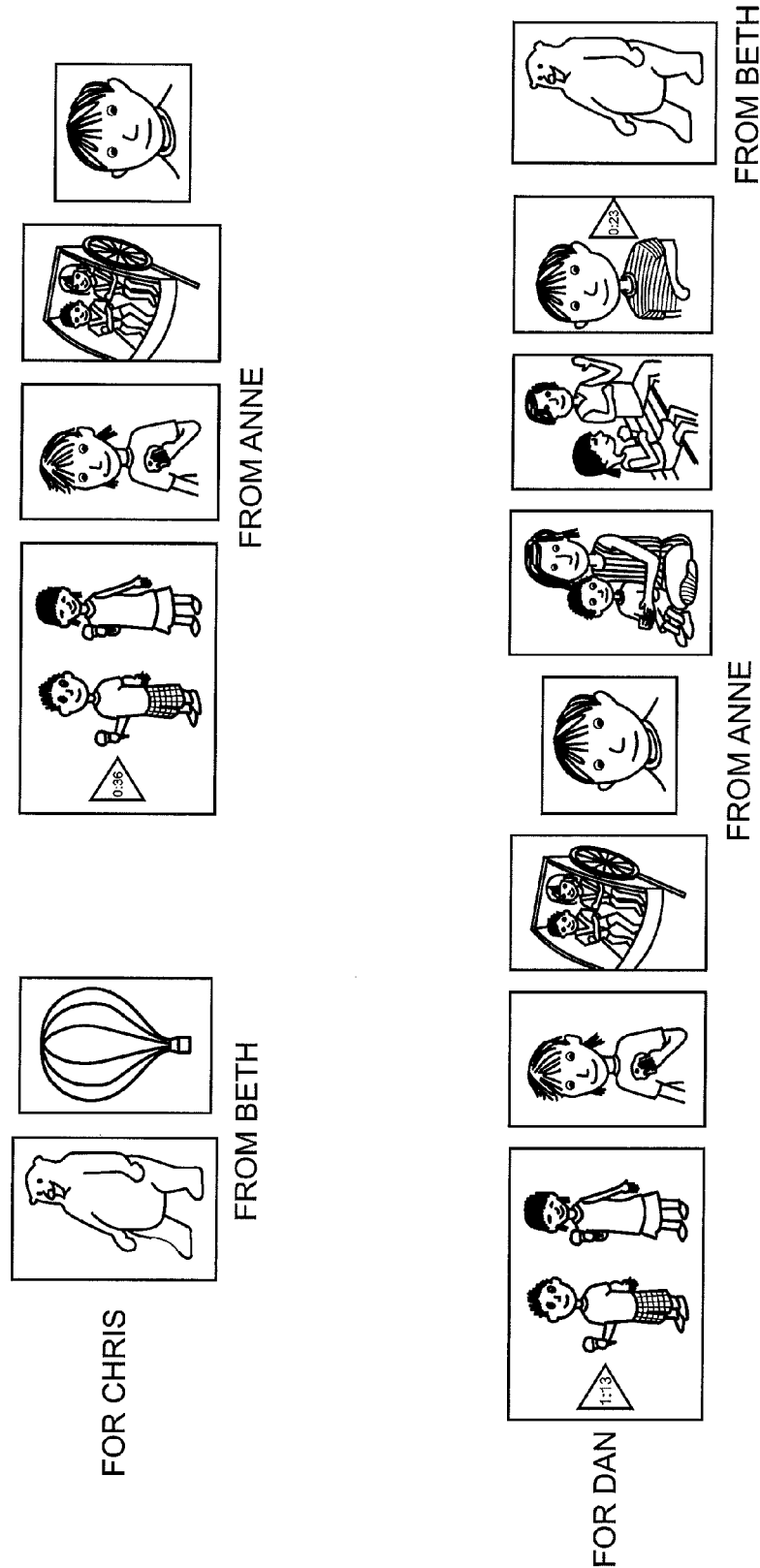
FIG. 4 shows illustrative results of the present invention for a social network containing four people.

FIG. 4 shows illustrative results of the present invention for a social network containing four people Anne, Beth, Chris, and Dan. Both Anne and Beth post image collections to the social network. After finding the social distance 120 between Chris and Anne, and Chris and Beth, then determining social summarization parameters 124 for each, Chris receives access to two images+a summarized video (36 seconds) from Anne, and two images from Beth. Meanwhile, Dan is socially closer (i.e. the social distance 120 between Dan and Anne is smaller than that between Chris and Anne) to Anne than Chris is, and consequently Dan receives five images and two summarized videos (one 1 minute 13 seconds, and one 23 seconds) from Anne. Further, Dan is socially further from Beth than Chris is from Beth, so Dan receives only one image from Beth. Note also that the order of presentation of the summarized image collections is related to the relative social distances between the respective viewers and users (e.g. for Chris, Beth's images are ranked higher than Anne's, but to Dan, the reverse is true.)

The invention has been described in detail with particular reference to certain preferred embodiments thereof, but it will be understood that variations and modifications can be effected within the spirit and scope of the invention.

PARTS LIST 1 distance
2 distance
12 digital processor
30 image capture device
32 image or video
43 compass
45 tilt sensor
47 accelerometer
49 light source
60 user controls
62 user preferences
69 enhanced image
70 image processor
90 display
100 user
102 image collection
104 social network media summarizer
106 collection analyzer
108 collection analysis
$110_1$ viewers
$110_2$ viewers
$110_3$ viewers
116 social network
118 social distance analyzer
120 social distance
122 parameter selector
124 social summarization parameters
126 collection summarizer
128 summarized image collection
322 RAM buffer memory
324 real time clock
328 firmware
329 GPS sensor
340 audio codec
341 general control computer
342 microphone
344 speaker
350 wireless modem
358 mobile phone network
370 internet
375 image player
420A individual
420B individual
420C individual
420D individual
420E individual
420F individual
420G individual
420H individual
420I individual
420J individual
420K individual
420M individual
422 persons
422A person
422D person
422E person
422F person
422I person
422M person
424 connection
426 associative connection
428 image connection
430 digital media assets
431 video digital asset
432 unidentified individual
434 unidentified individual
436 unidentified individual
438 unidentified individual

The invention claimed is:

1. A method for reducing a number of still images or a length of a video from a digital image collection using a social network, comprising:
    (a) receiving a digital image collection captured by a user to be viewed by a viewer, wherein the viewer and the user are members of the same social network;
    (b) using a processor to access the social network to determine a relationship between the viewer and the user;
    (c) using the processor to determine a set of summarization parameters based on the relationship between the viewer and the user, wherein both the user and the viewer together constrain the set of summarization parameters;
    (d) using the processor to reduce the number of still images or the length of the video from the digital image collection using the set of summarization parameters to be viewed by the viewer; and
    wherein the set of summarization parameters include a length of a summary, minimum length of any snippet of video contained in the summary, and a total number of snippets contained in the summary; as well as a maximum percentage of total images and videos from a particular user to the viewer over a given time period, including a first-ranked user,
    wherein the maximum percentage is calculated by an inverse social distance of the particular user.

2. The method of claim 1 further including displaying a summarized digital image collection to the viewer.

3. The method of claim 1, wherein when the digital image collection contains a video, the set of summarization parameters include a parameter that limits a length of a summarized video.

4. The method of claim 1, wherein the digital image collection contains a set of still images, the set of summarization parameters include a parameter that limits a total number of still images in a summarized image collection.

5. The method of claim 1, wherein the social network is represented as a graph having vertices that represent people in the social network and edges that represent connections between people, and determining the relationship between the viewer and the user includes determining a distance between the viewer and the user in the graph.

6. A method for selectively reducing a number of still images or a length of a video from a digital image collection using a social network individually for at least two viewers, comprising:
   (a) receiving a digital image collection captured by a user to be viewed by at least two viewers, wherein the at least two viewers and the user are members of the same social network;
   (b) using a processor to access the social network to determine a relationship between each viewer and the user;
   (c) using the processor to determine a set of summarization parameters for each viewer based on the relationship between each viewer and the user;
   (d) using the processor to reduce the number of still images or the length of the video from the digital image collection for each viewer using the set of summarization parameters to be viewed by each viewer; and
   wherein the set of summarization parameters include a length of a summary, minimum length of any snippet of video contained in the summary, and a total number of snippets contained in the summary; as well as a maximum percentage of total images and videos from a particular user to the viewer over a given time period, including a first-ranked user, wherein the maximum percentage is calculated by an inverse social distance of the particular user.

7. The method of claim 6 further including displaying a summarized digital image collection to each viewer.

8. The method of claim 6, wherein when the digital image collection contains a video, the set of summarization parameters include a parameter that limits a length of a summarized video.

9. The method of claim 6, wherein the digital image collection contains a set of still images, the set of summarization parameters include a parameter that limits a total number of still images in a summarized image collection.

10. The method of claim 1, wherein the set of summarization parameters include number, content, type, or length values provided by the viewer.

11. The method of claim 1, wherein when the particular user has fewer images or a total video length smaller than that allowed by the maximum percentage, the excess is passed on to other users of the social network.

12. The method of claim 6, wherein when the particular user has fewer images or a total video length smaller than that allowed by the maximum percentage, the excess is passed on to other users of the social network.

13. The method of claim 1, further comprising wherein the maximum percentage is calculated by an inverse social distance of the particular user divided by the sum of inverse social distances of all users of the same social network.

14. The method of claim 6, further comprising wherein the maximum percentage is calculated by an inverse social distance of the particular user divided by the sum of inverse social distances of all users of the same social network.

* * * * *